L. T. MART.
GAGE COCK.
APPLICATION FILED MAR. 3, 1914.

1,162,630.

Patented Nov. 30, 1915.

Witnesses

Inventor
L. T. Mart.
By ........... Attorney

UNITED STATES PATENT OFFICE.

LEON T. MART, OF YOUNGSTOWN, OHIO.

GAGE-COCK.

1,162,630.

Specification of Letters Patent.

Patented Nov. 30, 1915.

Application filed March 3, 1914. Serial No. 822,155.

*To all whom it may concern:*

Be it known that I, LEON T. MART, a citizen of the United States, residing at Youngstown, in the county of Mahoning and State of Ohio, have invented certain new and useful Improvements in Gage-Cocks; and I do hereby declare the following to be a full, clear, and exact description of the invention, such as will enable others skilled in the art to which it appertains to make and use the same.

This invention relates to gage cocks, and one of the principal objects of the invention is to provide efficient means for automatically closing the outlet opening in the cock when it is desired to remove the valve for cleaning or repairing the valve seat and valve.

Another object of the invention is to provide a gage cock of simple construction comprising a valve, a removable seat for said valve, and means whereby the outlet opening in the cock is automatically closed when the valve seat and valve are removed for cleaning or repairing the valve or its seat.

Figure 1:
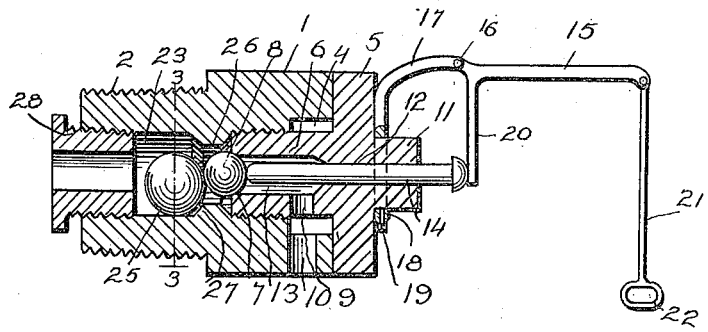
Figure 2:
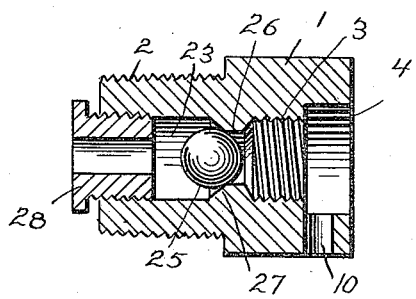
Figure 3:
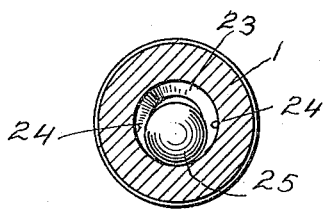

These and other objects may be attained by means of the construction illustrated in the accompanying drawing, in which, Figure 1 is a vertical sectional view taken through the cock and showing pop lever and connected parts in elevation, Fig. 2 is a sectional view taken through the valve casing with the valve seat member and valve removed, and the opening closed by the repairing valve, Fig. 3 is a sectional view taken on the line 3—3 of Fig. 1.

Referring to the drawing, the numeral 1 designates the valve casing, which is reduced and screw threaded at 2 for engagement with a water column of a boiler. The casing 1 is provided with a screw threaded bore 3 near its outer end, and a communicating recess 4 of greater diameter than the screw threaded bore. Fitted within the threaded bore 3 is a valve seat member comprising a plane annular member 5 having an integral boss 6 threaded to fit the bore 3 at its inner end, and provided with a valve seat 7 for a ball valve 8. The portion 6 of the valve seat member is provided with a perforation 9 which is disposed in alinement with the outlet opening 10 in the valve casing 1, said outlet opening 10 communicating with the recess 4. A boss 11 formed integral with the member 5 is provided with a central opening 12 which extends through both the boss 11 and the member 5 into the enlarged recess 13 in the valve seat member 6. A sliding stem 14 is mounted in the bore, with its inner end disposed in contact or nearly in contact with the valve 8, while the outer end normally extends some distance beyond the boss 11, as shown more clearly in Fig. 1. The pop lever 15 is pivotally connected at 16 to a bracket 17 provided with a ring 18 encircling the boss 11 and secured thereto by means of a set screw 19. The pop lever 15 is provided with a depending arm 20 disposed in alinement with the outer end of the stem 14, and said pop lever is provided with a depending operating rod 21 having a handle 22 thereon. The valve casing 1 is provided with a recess 23 having annular walls 24, and seated in the said recess is the repair valve 25. The recess 23 communicates with the outlet opening 10 through the duct 26 when the valve 8 is unseated. A flaring valve seat 27 is formed within the casing 1 for the repair valve 25, and threaded member 28 is fitted within the valve casing to hold the repair valve 25 in the recess 23.

When the lever 15 is operated, the stem 14 is forced against the valve 8 to unseat the same and to permit the steam and water to pass through the recess 13 and out through the discharge opening 10. In case of a leakage owing to the imperfect seating of the valve 8 against the seat 7, the valve seat member may be withdrawn by means of a suitable tool, and the valve 8 withdrawn, when the pressure from the boiler will move the repair valve 25 up against the valve seat 27 to prevent escape of the steam. When the valve and the valve seat member have been cleaned and repaired, the parts may be readily connected up as shown in Fig. 1.

From the foregoing it will be obvious that a gage cock made in accordance with this invention is simple in construction and provides a reliable and efficient means for closing the outlet when it is necessary to remove the valve for regrinding, cleaning, or repairing.

Various changes may be made in the details of construction without departing from the spirit and scope of the invention as defined in the claim.

What is claimed is:—

A gage cock comprising a casing having a bore extending therethrough, said bore being restricted intermediate its length to provide an annular shoulder, a seat member removably secured in the outer end of the casing and provided with an axial bore registering with the bore of said casing, and an outlet port communicating with said axial bore, said seat member terminating adjacent said shoulder, a ball valve disposed in said casing bore and adapted to seat on said seat member, a second ball valve housed within said casing bore on the inlet side of said shoulder, said second ball being of larger diameter than the restricted portion of the casing bore defined by said shoulder, the said shoulder providing a seat for the second valve, a tubular member threaded into the inner end of the casing bore to retain the second ball valve within said casing bore, means for unseating the first named valve, the two valves being normally in contacting relation, and the first named valve normally preventing the seating of the second valve.

In testimony whereof I affix my signature in presence of two witnesses.

LEON T. MART.

Witnesses:
L. WAGNER,
VENICE J. LAMB.

Copies of this patent may be obtained for five cents each, by addressing the "Commissioner of Patents, Washington, D. C."